United States Patent
Faler

(10) Patent No.: US 7,022,806 B2
(45) Date of Patent: *Apr. 4, 2006

(54) METHODS FOR CONVERTING LINEAR POLYESTERS TO MACROCYCLIC OLIGOESTER COMPOSITIONS AND MACROCYCLIC OLIGOESTERS

(75) Inventor: Gary R. Faler, Glenville, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,212

(22) Filed: Nov. 29, 2004

(65) Prior Publication Data

US 2005/0176917 A1    Aug. 11, 2005

Related U.S. Application Data

(63) Continuation of application No. 10/373,666, filed on Feb. 24, 2003, now Pat. No. 6,855,798, which is a continuation of application No. 09/945,233, filed on Aug. 31, 2001, now Pat. No. 6,525,164.

(60) Provisional application No. 60/229,894, filed on Sep. 1, 2000.

(51) Int. Cl.
C08G 63/78 (2006.01)
C08K 3/10 (2006.01)

(52) U.S. Cl. ........... 528/279; 528/283; 528/300; 528/302; 528/307; 528/308; 528/503; 525/437; 525/444; 524/783; 524/792

(58) Field of Classification Search ........ 528/279, 528/283, 300, 302, 307, 308, 503; 525/437, 525/444; 524/783, 792
See application file for complete search history.

(56) References Cited

U.S. PATENT DOCUMENTS

| | | | |
|---|---|---|---|
| 2,628,171 A | 2/1953 | Green | 106/271 |
| 3,018,272 A | 1/1962 | Griffing et al. | 260/75 |
| 3,090,753 A | 5/1963 | Matuszak et al. | 252/42.7 |
| 3,786,067 A | 1/1974 | Throckmorton et al. | 260/327 |
| 3,964,923 A | 6/1976 | Zetmeir | |
| 3,979,354 A | 9/1976 | Dyckman et al. | |
| 4,012,460 A | 3/1977 | Takahashi | |
| 4,063,009 A | 12/1977 | Ziegler et al. | |
| 4,075,319 A | 2/1978 | Dyckman et al. | |

(Continued)

FOREIGN PATENT DOCUMENTS

BE    676324    6/1966

(Continued)

OTHER PUBLICATIONS

Ahjopalo, L. et al. (2000) "Cyclic Oligomers in Saturated Polyesters" Polymer, vol. 41, No. 23, 8283-8290.

(Continued)

Primary Examiner—Samuel A. Acquah
(74) Attorney, Agent, or Firm—Goodwin Procter LLP

(57) ABSTRACT

Macrocyclic oligoesters and compositions comprising macrocyclic oligoesters are prepared from intermediate molecular weight polyesters. In one embodiment, a diol is contacted with a dicarboxylic acid or a dicarboxylate in the presence of a catalyst to produce a composition comprising a hydroxyalkyl-terminated polyester oligomer. The hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising a macrocyclic oligoester. An optional step is to separate the macrocyclic oligoester from the composition comprising the macrocyclic oligoester.

26 Claims, 2 Drawing Sheets

U.S. PATENT DOCUMENTS

| | | |
|---|---|---|
| 4,082,709 A | 4/1978 | Dyckman et al. |
| 4,101,600 A | 7/1978 | Zhukov et al. |
| 4,115,468 A | 9/1978 | Antonov et al. |
| 4,118,432 A | 10/1978 | Kabanov et al. |
| 4,129,548 A | 12/1978 | McDonnell |
| 4,165,305 A | 8/1979 | Sundie et al. |
| 4,187,197 A | 2/1980 | Kabanov et al. |
| 4,230,824 A | 10/1980 | Nodelman |
| 4,232,087 A | 11/1980 | Trask |
| 4,233,232 A | 11/1980 | Howarth |
| 4,235,825 A | 11/1980 | Milam |
| 4,341,842 A | 7/1982 | Lampe |
| 4,377,684 A | 3/1983 | Bolon et al. |
| 4,409,266 A | 10/1983 | Wieczorrek et al. |
| 4,461,854 A | 7/1984 | Smith |
| 4,478,963 A | 10/1984 | McGarry |
| 4,518,283 A | 5/1985 | Gebauer et al. |
| 4,520,123 A | 5/1985 | Hall |
| 4,525,565 A | 6/1985 | Laisney et al. |
| 4,535,102 A | 8/1985 | Kusumoto et al. |
| 4,547,531 A | 10/1985 | Waknine |
| 4,559,262 A | 12/1985 | Cogswell et al. |
| 4,568,703 A | 2/1986 | Ashida ............ 521/124 |
| 4,584,254 A | 4/1986 | Nakayama et al. |
| 4,590,259 A | 5/1986 | Kosky et al. .......... 528/272 |
| 4,591,624 A | 5/1986 | Hall |
| 4,605,731 A | 8/1986 | Evans et al. ........... 528/371 |
| 4,616,077 A | 10/1986 | Silva .................. 528/371 |
| 4,638,077 A | 1/1987 | Brunelle et al. ........ 558/281 |
| 4,644,053 A | 2/1987 | Brunelle et al. ........ 528/371 |
| 4,647,633 A | 3/1987 | Kostelnik |
| 4,672,003 A | 6/1987 | Letoffe |
| 4,680,345 A | 7/1987 | Kobayashi et al. ...... 525/437 |
| 4,725,666 A | 2/1988 | Curatolo et al. |
| 4,727,134 A | 2/1988 | Brunelle et al. ........ 528/371 |
| 4,740,583 A | 4/1988 | Brunelle et al. ........ 528/370 |
| 4,757,132 A | 7/1988 | Brunelle et al. ........ 528/357 |
| 4,785,060 A | 11/1988 | Nagler ................. 525/444 |
| 4,803,288 A | 2/1989 | Kitamura et al. ........ 549/267 |
| 4,812,524 A | 3/1989 | Baghdachi |
| 4,816,548 A | 3/1989 | Evans et al. ........... 528/370 |
| 4,824,595 A | 4/1989 | Richter et al. |
| 4,829,144 A | 5/1989 | Brunelle et al. ........ 528/176 |
| 4,831,001 A | 5/1989 | Evans et al. ........... 502/153 |
| 4,845,178 A | 7/1989 | Hostetler et al. |
| 4,852,591 A | 8/1989 | Wisotzki et al. |
| 4,880,848 A | 11/1989 | Ghali |
| 4,888,411 A | 12/1989 | Shannon et al. ........ 528/199 |
| 4,889,885 A | 12/1989 | Usuki et al. |
| 4,889,903 A | 12/1989 | Baghdachi |
| 4,900,706 A | 2/1990 | Sasaki et al. .......... 502/116 |
| 4,904,810 A | 2/1990 | Brunelle et al. ........ 558/281 |
| 4,909,846 A | 3/1990 | Barfurth et al. ........ 106/22 |
| 4,927,728 A | 5/1990 | Isoda et al. |
| 4,942,198 A | 7/1990 | Dickerhof et al. |
| 4,980,453 A | 12/1990 | Brunelle et al. ........ 528/352 |
| 4,992,228 A | 2/1991 | Heck et al. ............ 264/135 |
| 4,994,541 A | 2/1991 | Dell et al. |
| 4,999,420 A | 3/1991 | Leitz et al. ........... 528/371 |
| 5,006,637 A | 4/1991 | Guggenheim et al. ..... 528/355 |
| 5,019,450 A | 5/1991 | Cogswell et al. |
| 5,023,346 A | 6/1991 | Schon et al. ........... 549/231 |
| 5,039,717 A | 8/1991 | Kawakami et al. ....... 523/100 |
| 5,039,783 A | 8/1991 | Brunelle et al. ........ 528/272 |
| 5,051,482 A | 9/1991 | Tepic |
| 5,071,711 A | 12/1991 | Heck et al. ........... 428/542.8 |
| 5,095,088 A | 3/1992 | Wang ................. 528/203 |
| 5,097,008 A | 3/1992 | Krabbenhoft et al. .... 528/371 |
| 5,116,900 A | 5/1992 | Flautt et al. .......... 524/377 |
| 5,124,427 A | 6/1992 | Potter et al. |
| 5,159,024 A | 10/1992 | Brindopke et al. |
| 5,175,228 A | 12/1992 | Wang et al. |
| 5,191,013 A | 3/1993 | Cook et al. ............ 524/601 |
| 5,191,038 A | 3/1993 | Krabbenhoft et al. .... 525/462 |
| 5,196,055 A | 3/1993 | Lesney et al. |
| 5,202,386 A | 4/1993 | Hogt et al. ............ 525/298 |
| 5,207,850 A | 5/1993 | Parekh ................ 156/166 |
| 5,214,158 A | 5/1993 | Brunelle et al. ........ 549/267 |
| 5,225,129 A | 7/1993 | van den Berg .......... 264/85 |
| 5,231,161 A | 7/1993 | Brunelle et al. ........ 528/272 |
| 5,235,018 A | 8/1993 | Potter et al. |
| 5,237,042 A | 8/1993 | Kim et al. ............ 528/279 |
| 5,241,880 A | 9/1993 | Mizobata et al. ....... 74/502.5 |
| RE34,431 E | 11/1993 | Brunelle et al. ........ 528/352 |
| 5,260,376 A | 11/1993 | Nakahata et al. |
| 5,264,548 A | 11/1993 | Brunelle et al. ........ 528/370 |
| 5,281,669 A | 1/1994 | Kambour et al. ........ 525/177 |
| 5,288,837 A | 2/1994 | Munjal et al. ......... 528/198 |
| 5,300,392 A | 4/1994 | Odell et al. ........... 430/130 |
| 5,300,393 A | 4/1994 | Odell et al. ........... 430/134 |
| 5,300,590 A | 4/1994 | Cook et al. ........... 525/444 |
| 5,302,484 A | 4/1994 | Odell et al. ........... 430/127 |
| 5,314,779 A | 5/1994 | Odell et al. ........... 430/127 |
| 5,321,117 A | 6/1994 | Brunelle .............. 528/272 |
| 5,340,909 A | 8/1994 | Doerr et al. ........... 528/276 |
| 5,348,985 A | 9/1994 | Pearce et al. .......... 521/124 |
| 5,349,040 A | 9/1994 | Trinks et al. |
| 5,350,726 A | 9/1994 | Shaffer |
| 5,350,819 A | 9/1994 | Shaffer |
| 5,356,984 A | 10/1994 | Carbone et al. ........ 524/431 |
| 5,386,037 A | 1/1995 | Takekoshi et al. ...... 549/206 |
| 5,387,666 A | 2/1995 | Takekoshi et al. ...... 528/283 |
| 5,389,719 A | 2/1995 | Takekoshi et al. ...... 524/784 |
| 5,407,984 A | 4/1995 | Brunelle et al. ........ 524/178 |
| 5,408,001 A | 4/1995 | Nakahata et al. |
| 5,410,014 A | 4/1995 | Haese et al. .......... 528/196 |
| 5,418,303 A | 5/1995 | Shaffer |
| 5,420,226 A | 5/1995 | Hamer et al. .......... 528/201 |
| 5,426,156 A | 6/1995 | Bederke et al. |
| 5,434,244 A | 7/1995 | Warner et al. ......... 528/490 |
| 5,439,996 A | 8/1995 | Baird et al. |
| 5,444,146 A | 8/1995 | Potter et al. |
| 5,446,122 A | 8/1995 | Warner et al. ......... 528/279 |
| 5,448,001 A | 9/1995 | Baird |
| 5,466,744 A | 11/1995 | Evans et al. .......... 524/714 |
| 5,498,651 A | 3/1996 | Brunelle .............. 524/176 |
| 5,506,316 A | 4/1996 | Shaffer |
| 5,506,328 A | 4/1996 | Chandalia et al. |
| 5,508,343 A | 4/1996 | Holley |
| 5,519,108 A | 5/1996 | Yuo et al. ............ 528/287 |
| 5,525,673 A | 6/1996 | Nakahata et al. |
| 5,527,976 A | 6/1996 | Takekoshi et al. ....... 585/16 |
| 5,530,052 A | 6/1996 | Takekoshi et al. ...... 524/447 |
| 5,591,800 A | 1/1997 | Takekoshi et al. ...... 524/783 |
| 5,605,979 A | 2/1997 | Priddy, Jr. et al. ..... 525/439 |
| 5,610,260 A | 3/1997 | Schmalstieg et al. |
| 5,637,655 A | 6/1997 | Priddy, Jr. et al. ..... 525/438 |
| 5,646,306 A | 7/1997 | Elsasser, Jr. ......... 549/267 |
| 5,648,454 A | 7/1997 | Brunelle .............. 528/491 |
| 5,654,395 A | 8/1997 | Jackson et al. ....... 528/308.3 |
| 5,656,712 A | 8/1997 | Mirossay |
| 5,661,214 A | 8/1997 | Brunelle et al. ....... 524/783 |
| 5,663,282 A | 9/1997 | Todt et al. ........... 528/274 |
| 5,668,186 A | 9/1997 | Brunelle et al. ........ 521/48 |
| 5,693,722 A | 12/1997 | Priddy, Jr. et al. ..... 525/439 |
| 5,700,888 A | 12/1997 | Hall .................. 526/190 |
| 5,703,183 A | 12/1997 | Shaffer |
| 5,707,439 A | 1/1998 | Takekoshi et al. ...... 106/483 |
| 5,710,086 A | 1/1998 | Brunelle et al. ........ 502/171 |
| 5,756,644 A | 5/1998 | Hodge et al. .......... 528/272 |
| 5,760,161 A | 6/1998 | Goins, Jr. et al. ..... 528/299 |
| 5,786,440 A | 7/1998 | Kohler et al. ......... 528/196 |
| 5,795,423 A | 8/1998 | Johnson .............. 156/166 |
| 5,830,541 A | 11/1998 | Carswell et al. ....... 427/475 |

| | | | | | | |
|---|---|---|---|---|---|---|
| 5,849,255 A | 12/1998 | Sawyer et al. | | EP | 02756358.4-2117 | 5/2004 |
| 5,869,586 A | 2/1999 | Riedel et al. | | EP | 1 475 402 | 11/2004 |
| 5,936,029 A | 8/1999 | Hall | 524/572 | EP | 03714278.3-2102 | 11/2004 |
| 5,947,392 A | 9/1999 | Molnar et al. | | EP | 01968413.3-2102 | 12/2004 |
| 5,965,686 A | 10/1999 | Blank et al. | | EP | 02734665.9-2102 | 12/2004 |
| 5,968,642 A | 10/1999 | Saito | 428/304.4 | EP | 02756358.4-2117 | 4/2005 |
| 6,074,978 A | 6/2000 | Shaffer | | FR | 2 530 628 | 1/1984 |
| 6,078,135 A | 6/2000 | Lee et al. | | GB | 798412 | 8/1954 |
| 6,080,834 A | 6/2000 | Putzig et al. | 528/279 | GB | 957841 | 5/1964 |
| 6,121,466 A | 9/2000 | Osterholt et al. | 549/267 | GB | 991020 | 5/1965 |
| 6,124,412 A | 9/2000 | Bin-Taleb et al. | 526/159 | GB | 1044205 | 9/1966 |
| 6,147,026 A | 11/2000 | Setiabudi et al. | | GB | 1108921 | 4/1968 |
| 6,171,995 B1 | 1/2001 | Muhlebach et al. | | GB | 1273225 | 5/1972 |
| 6,191,318 B1 | 2/2001 | Park et al. | | GB | 1349324 | 4/1974 |
| 6,211,316 B1 | 4/2001 | Seebach | | GB | 2 123 405 A | 2/1984 |
| 6,271,317 B1 | 8/2001 | Halasa et al. | | JP | 4621873 | 6/1971 |
| 6,284,868 B1 | 9/2001 | Geprags et al. | 528/392 | JP | 476425 | 10/1972 |
| 6,297,330 B1 | 10/2001 | Burch, Jr. et al. | 525/444 | JP | 57-122078 A | 7/1982 |
| 6,353,030 B1 | 3/2002 | Prikoszovich | 514/772.1 | JP | 6275547 | 4/1987 |
| 6,369,157 B1 | 4/2002 | Winckler et al. | 524/783 | JP | 62141063 A | 6/1987 |
| 6,376,026 B1 | 4/2002 | Correll et al. | 427/512 | JP | 63156824 A | 11/1988 |
| 6,414,103 B1 | 7/2002 | Correll et al. | 528/25 | JP | 02298512 | 12/1990 |
| 6,420,047 B1 | 7/2002 | Winckler et al. | 428/480 | JP | 4253764 | 9/1992 |
| 6,420,048 B1 | 7/2002 | Wang | 428/480 | JP | 08-093594 | 4/1996 |
| 6,432,486 B1 | 8/2002 | Paris et al. | | JP | 09048876 | 2/1997 |
| 6,436,548 B1 | 8/2002 | Phelps | 428/480 | JP | 09-110832 | 4/1997 |
| 6,436,549 B1 | 8/2002 | Wang | 428/480 | JP | 09-238806 | 9/1997 |
| 6,458,972 B1 | 10/2002 | Surburg et al. | 549/266 | JP | 10-069915 | 3/1998 |
| 6,525,164 B1 | 2/2003 | Faler | 528/279 | JP | 10-194262 | 7/1998 |
| 6,586,558 B1 | 7/2003 | Schmidt et al. | 528/271 | JP | 11-136942 | 5/1999 |
| 6,639,009 B1 | 10/2003 | Winckler et al. | 524/783 | JP | 2001031846 | 2/2001 |
| 6,646,134 B1 | 11/2003 | Brugel | | JP | 2002293902 | 10/2002 |
| 6,670,429 B1 | 12/2003 | Appelman et al. | | JP | 2002293903 | 10/2002 |
| 6,787,632 B1 | 9/2004 | Phelps et al. | | JP | 2002308969 | 10/2002 |
| 6,806,346 B1 | 10/2004 | Brugel | | JP | 2002317041 | 10/2002 |
| 6,831,138 B1 | 12/2004 | Wang | | JP | 02320499 | 11/2002 |
| 6,906,147 B1 | 6/2005 | Wang et al. | | JP | 02322272 | 11/2002 |
| 2004/0155380 A1 | 8/2004 | Kendall et al. | | JP | 02338672 | 11/2002 |
| 2004/0018883 A1 | 9/2004 | Barron et al. | | JP | 2003 082 081 | 3/2003 |
| 2005/0059768 A1 | 3/2005 | Dion et al. | | SU | 1077893 | 3/1984 |

FOREIGN PATENT DOCUMENTS

| | | |
|---|---|---|
| SU | 1532560 A1 | 12/1989 |
| WO | 88/06605 | 9/1988 |
| CH | 654 304 A5 | 2/1986 |
| WO | 91/09899 | 7/1991 |
| CN | 1120555 | 4/1996 |
| WO | 93/04106 | 3/1993 |
| DE | 3607627 | 9/1987 |
| WO | 95/00574 | 1/1995 |
| DE | 4034574 A1 | 5/1992 |
| WO | 95/30702 | 11/1995 |
| EP | 0000544 B1 | 8/1982 |
| WO | 96/22319 | 7/1996 |
| EP | 0153785 A2 | 9/1985 |
| WO | 99/25485 | 5/1999 |
| EP | 0216496 A2 | 4/1987 |
| WO | 00/27632 | 5/2000 |
| EP | 0153785 B1 | 7/1989 |
| WO | 00/38897 | 7/2000 |
| EP | 419254 A2 | 3/1991 |
| WO | 01/53379 A1 | 7/2001 |
| EP | 486832 A2 | 5/1992 |
| WO | 01/56694 A1 | 8/2001 |
| EP | 264835 B1 | 6/1992 |
| WO | 02/18476 A2 | 3/2002 |
| EP | 235741 B1 | 1/1993 |
| WO | 02/22738 A2 | 3/2002 |
| EP | 543492 A1 | 5/1993 |
| WO | 02/098946 A1 | 12/2002 |
| EP | 589640 A1 | 3/1994 |
| WO | 2002/098947 | 12/2002 |
| EP | 598604 A1 | 5/1994 |
| WO | 2003/002551 | 1/2003 |
| EP | 601753 A1 | 6/1994 |
| WO | 03/031496 A1 | 4/2003 |
| EP | 635512 A1 | 1/1995 |
| WO | 2003/031059 | 4/2003 |
| EP | 655476 A1 | 5/1995 |
| WO | 2003/080705 | 10/2003 |
| EP | 436186 B1 | 10/1995 |
| WO | 2004/058471 | 7/2004 |
| EP | 688778 A1 | 12/1995 |
| WO | 2004/058854 | 7/2004 |
| EP | 0714926 A2 | 6/1996 |
| WO | 2004/058868 | 7/2004 |
| EP | 699701 A3 | 9/1996 |
| WO | 2004/058872 | 7/2004 |
| EP | 0798336 A2 | 1/1997 |
| WO | 2004/060640 | 7/2004 |
| EP | 0 594 385 | 5/2003 |
| EP | 1 308 208 | 5/2003 |
| EP | 1 354 908 | 10/2003 |
| EP | 01968581.7-2102 | 11/2003 |
| EP | 1 378 540 | 1/2004 |
| EP | 01942649.3-2102 | 1/2004 |
| EP | 1 420 036 | 5/2004 |

OTHER PUBLICATIONS

Beach, A. Christopher G. "The Preparation of Mirrors by Sputtering Metals onto Glass Surfaces," *A. Inst. P.*, Chelsea Polytechnic, M.S. received, Mar. 17, 1930.

Brunelle (1995) "Macrocycles For The Synthesis of High Molecular Weight Polymers" pp. 197-235, ch. 6, New Methods of Polymer Synthesis: vol. 2, edited by J.R. Ebdon and G.C. Eastmond.

Brunelle et al. (1997) "Semi-crystalline Polymers via Ring-Opening Polymerization: Preparation and Polymerization of Alkylene Phthalate Cyclic Oligomers" *Polymers Preprints* vol. 38, No. 2, pp. 381-382.

Brunelle et al. (1998) "Semicrystalline Polymers via Ring-Opening Polymerization: Preparation and Polymerization of Alkylene Phthalate Cyclic Oligomers" *Macromolecules* vol. 31, No. 15, 4782-4790.

Burch, R. R. et al. (2000) "Synthesis of Cyclic Oligoesters and Their Rapid Polymerization to High Molecular Weight" Macromolecules, vol. 33, No. 14, 5053-5064.

Chisholm et al. "Syntheses and structural characterization of 2,2'-methylene-bis(6-*t*-butyl-4-methyl-phenoxide) complexes of titanium, zirconium and tantalum," *Polyhedron*, vol. 16, No. 17, (1997) pp. 2941-2949.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157-161.

Cussler et al. "Barrier Membranes," *Journal of Membrane Science*, 38 (1988) pp. 161-174.

Durfee et al. "Chemical and Electrochemical Reduction of Titanium (IV) Aryloxides," *Inorganic Chemistry*, 24 (1985) pp. 4569-4573.

Fantacci et al. "Density Functional Study of Tetraphenolate and Calix[4]arene Complexes of Early Transition Metals," *Inorganic Chemistry*, 40 (2001) pp. 1544-1549.

Fukushima et al. "Graphite Nanoplatelets as Reinforcements for Polymers: Structural, Electrical and Thermal Properties," *Proc. 2nd Ann., Automotive Comp. Conf., Soc. Plast. Eng.*, Sep. 2002, 7 pgs.

Fukushima et al. "Synthesis of an Intercalated Compound of Montmorillonite and 6-Polyamide," *Journal of Inclusion Phenomena*, 5 (1987) pp. 473-482.

Hall et al. "Recent research on the synthesis and applications of cyclic oligomers," *Reactive & Functional Polymers*, 41 (1999), pp. 133-139.

Hamb et al. "Synthesis of Cyclic Tris(Ethylene Terephthalate)," *Polymer Letters*, 5 (1967), pp. 1057-1058.

Hamilton et al. (1998) "Cyclic Polyesters: Part 8. Preparation and Characterization of Cyclic Oligomers in Six Aromatic Ester and Ether-Ester Systems" *Polymer* vol. 39, No. 14., 3241-3252.

Harrison, A. G. et al. (1997) "Analysis of cyclic oligomers of poly(ethylene terephthalane) by liquid chromatography/mass spectrometry" Polymer Communications, vol. 38, No. 10, 2549-2555.

Henshaw et al. (1994) "Recycling of a Cyclic Thermoplastic Composite Material by Injection and Compression Molding" *J. of Thermoplastic Composite Materials* vol. 7 (1), 14-29.

Hubbard, P. A. (1996) "Polyesters via Macrocyclic Oligimers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373-1378.

Kricheldorf, H. R. et al. (1998) "Macrocycles. 3. Telechelic Polylactones via Macrocyclic Polymerization" Macromolecules, vol. 31, No. 3, 614-620.

Lattimer et al. (1998) "MALDI-MS Analysis of Pyrolysis Products From a Segmented Polyurethane" *Journal of Analytical and Applied Pyrolysis*, vol. 48, 1-15.

Lui et al. (1999) "Preparation of Cyclic Polyester Oligomers and Ultra-Low VOC Polyester Coatings" *Polymer Reprints*, vol. 40, No. 1, pp. 137-138.

Martin et al. (1987) "Pultrusion", *Engineered Materials Handbook: vol. 1 Composites*, pp. 533-543.

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487-95.

Mueller, F. J. et al. (1983) "Synthesis of Cyclic Oligomers of Butylene Terephthalate" *Makromol. Chem.*, vol. 184, No. 12, 2487-95. (Translation).

Okuda et al. "Synthesis and Characterization of Mononuclear Titanium Complexes Containing a Bis (phenoxy) Ligand Derived from 2,2'-Methylene-bis(6-*tert*-butyl-4-methylphenol)," *Chem. Ber.*, vol. 128, (1995) pp. 221-227.

Perovic, A. (1985) "Morphological Instability of poly (ethylene terephthalate) cyclic oligomer crystals" *Journal of Material Science*, vol. 20, Iss. 4, 1370-1374.

Perovie et al. (1982) "Crystallization of Cyclic Oligomers in Commercial Poly(ethleneterephthalate) Films" *Polymer Bulletin* vol. 6, 277-283.

Roelens, S. (1988) "Organotin-Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617-1625.

Ruddick et al. "A new method for the polymer-suported synthesis of cyclic oligoesters for potential applications in macrocyclic lactone synthesis and combinatorial chemistry," *J. Chem. Soc., Perkin Trans. 1*, 2002, pp. 627-637.

Spanagel et al. "Macrocyclic Esters," Contribution No. 153 from The Experimental Station of E.I. duPont deNemours &Company, vol. 57, pp. 929-934.

Toth et al. "Towards supported catalyst models: the synthesis, characterization, redox chemistry, and structures of the complexes Ti(Oar')$_4$ (Ar' = $C_6H_4$(2-*t*-Bu), $C_6$H(2,3, 5,6-Me)$_4$)," *Canadian Journal of Chemistry*, vol. 69, (1991) pp. 172-178.

Uhi et al. "Flame Retarduncy of Graphite Nanocomposites," *Polym. Mater. Sci. Eng.* 83:56(2000).

Usuki et al. "Swelling behavior of montmorillonite cation exchanged for ω-amino acids by ε-caprolactam," *J. Mater. Res.*, vol. 8, No. 5, May 1993, pp. 1174-1178.

Usuki et al. "Synthesis of nylon 6-clay hybrid," J. Mater. Res., vol. 8, No. 5, May 1993, pp. 1179-1184.

Ward et al. "Gas barrier improvement using vermiculite and mica in polymer films," *Journal of Membrane Science*, 55 (1991) pp. 173-180.

Xiao et al. "Preparation of exfoliated graphite/polystyrene composite by polymerization-filling technique," *Polymer*, 42 (2001) pp 4813-4816.

Youk et al. "Polymerization of Ethylene Terephthalate Cyclic Oligomers with Antimony Trioxide," *Macromolecules*, 33 (2000), pp. 3594-3599.

Bagshaw et al., "Templating of Mesoporous Molecular Sieves by Nonionic Polyethylene Oxide Surfactants," Science, 269, p. 1242, Sep. 1, 1995.

Deleuze et al. (1998) "Polymer-Supported Titanates as Catalysts for Transesterification Reactions" *Poylmers*, vol. 39, No. 24, pp. 6109-6114.

Deleuze et al. (2000) "Synthesis of Porous Supports Containing N-(p-hydroxyphenyl)- or N-(3-4-dihydroxybenzyl) Maleimide-Anchored Titanates and Application as Catalysts for Transesterification and Epoxidation Reactions" *Journal of Polymer Science*, vol. 38, pp. 2879-2886.

DuPont™ Zonyl® Fluorosurfactants Dupont The Miracles of Science "Chemicals to Enhance Your Product's Peformance" http://www.dupont.com/zonyl/perform.html, last searched on May 16, 2002 and pp. 1-3 downloaded on May 16, 2002.

DuPont™ Tyzor® Organic Titanates General Brochure (2001) E.I. du Pont de Nemours and Company, 12 pages.

Kaviratna et al., "Synthesis of Polyether-Clay Nanocomposites: Kinetics of Epoxide Self-Polymerization in Acidic Smectite Clays," Polym. Prep., 31(1), 788 (1994).

Kojima et al., "Mechanical properties of nylon 6-clay hybrid," J. Mater. Res., 8, 1185 (1993).

Lancaster Results, Titanium (IV), http://www.lancastersynthesis.com/home_quick_search.htm; pp. 1-3 downloaded on Nov. 29, 2001; last searched on Apr. 22, 2002 and pp. 4-8 downloaded on Apr. 22, 2002.

Lee, J. et al., "Fire Retardent Polyetherimide Nanocomposites," Matter Res. Soc. Proc., 457, 513-518, (1997).

Lee, S.-S. et al., "Synthesis of PET-Layered Silicate Nanocomposites Using Cyclic Ester Oligomers," Polymeric Materials: Science and Engineering, 89, 370-1 (2003).

Lewis et al. (1999) "A Highly Efficient Preparation of Methacrylate Esters using Novel Solid Phase Titanium-Based Transesterification Catalysts" *Synlett*, pp. 957-959.

Messersmith et al., "Polymer-Layered Silicate Nanocomposites: In Situ Intercalative Polymerization of E-Caprolactone in Layered Silicates," Chem. Mater., 5, 1064 (1993).

Nazar, et al., "Synthesis and Properties of a New (PEO)x [Na(H2O)]0.25MoO3 Nanocomposites," J. Mater. Res., 5 (11), 1985 (1995).

Okada, et al., "Synthesis and Characterization of a Nylon 6-Clay Hybrid," Polym. Prep., 28, 447, (1987).

Oriakhi et al., "Poly(Pyrrole) and Poly(Thiophene) / Clay Nanocomposites Via Latex-Colloid Interaction," Mater. Res. Bull., 30, No. 6, p. 723, (1995).

Product Detail and structure Image, Titanium (IV) butoxide, polymer, http://www.sigmaaldrich.com/cgi-in/hsrun/Distributed/HahtShop/HahtShop.htx; start=HS_FramesetMain; last searched on Mar. 27, 2002 and pp. 1-2 downloaded on Mar. 27, 2002.

Scatteia et al., "Rheology of PBT-Layered Silicate Nanocomposites Prepared by Melt Compounding," Plastics, Rubbers and Composites, 33, 85-91 (2004) and references therein.

Tripathy, et al., "Poly(Butylene Terephthalate) Nanocomposites Prepared by In-Situ Polymerization," Macromolecules, 36, 8593-5 (2003).

Vankelecom et al. "Incorporation of Zeolites in polyimide Membranes," J. Phys. Chem., 99, 13187 (1995).

Yano, K. et al., "Synthesis and Properties of Polyimide-Clay Hybrid," J. Polym. Sci., Part A, Polym. Chem., 31, 2493 (1993).

METHODS FOR CONVERTING LINEAR POLYESTERS TO MACROCYCLIC OLIGOESTER COMPOSITIONS AND MACROCYCLIC OLIGOESTERS

This application is a continuation of U.S. Utility patent application Ser. No. 10/373,666, filed on Feb. 24, 2003, now U.S. Pat. No. 6,855,798, which is a continuation of U.S. Utility patent application Ser. No. 09/945,233, filed on Aug. 31, 2001, which issued as U.S. Pat. No. 6,525,164 on Feb. 25, 2004, which application claims priority to provisional patent application U.S. Ser. No. 60/229,894 filed on Sep. 1, 2000, the entire contents of both Utility Patent Applications and the provisional patent application are incorporated by reference herein.

TECHNICAL FIELD

This invention generally relates to macrocyclic polyesters. More particularly, the invention relates to a method for preparing macrocyclic oligoester compositions from intermediate molecular weight polyesters.

BACKGROUND INFORMATION

Macrocyclic oligoesters, also called macrocyclic polyester oligomer compositions, can be converted, often under isothermal conditions, to linear polyesters of high crystallinity and solvent resistance.

One method for preparing macrocyclic oligoesters is accomplished by the reaction of diols, such as ethylene glycol or 1,4-butanediol, with dicarboxylic acid chlorides, such as terephthaloyl chloride or isophthaloyl chloride, under specifically defined conditions. Other methods of preparing macrocyclic polyester oligomer compositions include the reaction of a dicarboxylic acid chloride, such as terephthaloyl chloride, with a bis(hydroxyalkyl) dicarboxylate, such as bis(4-hydroxybutyl) terephthalate.

Another macrocyclic oligoester preparation method is catalytic depolymerization of linear polyesters such as poly (1,4-butylene terephthalate) ("PBT") and poly(ethylene terephthalate) ("PET"). Catalytic depolymerization macrocyclic oligoester preparation methods require that linear polyesters be purchased or manufactured prior to macrocyclic oligoester production. Producing macrocyclic oligoesters from high molecular weight linear polyesters necessitates handling of a high molecular weight material. The high molecular weight linear polyester material typically has a high viscosity, which requires costly equipment. In some instances it also requires many expensive finishing steps.

For example, prior art methods employ melt reactors that are capable of generating surface area in high viscosity high molecular weight material. Where poly(butylene terephthalate) is reacted with 1,4-butanediol, it is necessary to generate surface area to enable the diol to diffuse to the surface so that the reaction may proceed to build the molecular weight of the polymer. When high viscosity high molecular weight materials are prepared, diffusion of the diol from the polymer matrix is rate limiting and generating surface area by employing a melt reactor increases the reaction rate of the process of building the molecular weight of the polymer. Such melt reactors are highly engineered, energy intensive, and are run under relatively high vacuum conditions (e.g., 0.5 Torr) that are necessary to handle the high viscosity material.

Further, U.S. Pat. No. 4,590,259 to Kosky et al. describes a method for preparing poly(alkylene terephthalates) of blow molding grade in which a final step is conducted under conditions necessitated by the high melt viscosity of high molecular weight polyesters. A prepolymer preparation step is described in which, for example, a poly(butylene terephthalate) undergoes reaction with 1,4-butanediol. The resulting prepolymer undergoes reaction further with the diol in the presence of an inert gas to reduce the number of acid end groups, for example carboxylic acid end groups, to a desired level. Thereafter, solid state polymerization is conducted whereby the molecular weight of the polymer is increased under high vacuum conditions.

SUMMARY OF THE INVENTION

The invention generally relates to methods for depolymerizing linear polyesters to macrocyclic oligomer compositions. In one aspect of the invention, an intermediate molecular weight polyester is employed to prepare a composition comprising a macrocyclic oligoester. In one embodiment, a diol is contacted with a dicarboxylic acid or dicarboxylate in the presence of a catalyst to produce a composition comprising a hydroxyalkyl-terminated polyester oligomer. Thereafter, the hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising a macrocyclic oligoester. The composition comprising macrocyclic oligoester includes, for example, a mixture of macrocyclic oligoesters and linear oligoesters. An optional step is to separate a macrocyclic oligoester from the composition comprising the macrocyclic oligoester.

Methods of the invention minimize operations and eliminate the need for costly equipment. Of the steps used to manufacture linear polyesters, only those steps necessary for ultimate recovery of macrocyclic oligomers are employed and integrated with the operations necessary to recover a macrocyclic oligomer composition. For example, the use of costly melt reactors is unnecessary. Later steps in prior art polyester preparation, in particular steps necessary to produce a high molecular weight product, are eliminated thereby providing a product adequate for conversion to macrocyclic oligomers without significant loss in yield.

Methods of the invention also permit the use of equipment that transports low viscosity materials, whereby these methods are less expensive than prior art alternatives. According to the invention, low viscosity intermediate molecular weight polyesters are employed to make macrocyclic oligoesters. However, compared to the above-described methods employing high molecular weight polymers, methods of the present invention employing intermediate molecular weight polyesters have an increased number of linear polyesters with uncyclizable end groups remaining after cyclization. To promote further reaction to form macrocyclic oligoesters from intermediate molecular weight polyesters, it may be desirable to remove an uncyclizable end group, e.g., a hydroxyalkoxy group, from the linear polyester to create an intermediate molecular weight polyester capable of forming a macrocyclic oligoester. Removal of an end group results in by-product diol, which may be the starting material diol, i.e., the first compound.

In one embodiment, one or more solvents are employed for removal of by-product diol(s) by distillation, as the by-product diol(s) should be removed before cyclization takes place. The distillation may be, for example, azeotropic distillation, or distills or co-distills of the by-product diols may distill off at a temperature below the boiling point of the solvent. Thus, energy- and equipment-intensive methods, for example, melt reaction, necessitated by the high melt viscosity of the product are replaced by a simple distillation. In addition, the use of solvent reduces the viscosity of the macrocyclic polyester product, which enables the process to employ less costly equipment that is capable of transporting a low viscosity material.

Thereafter, the removed end groups, which typically result in by-product diols, may be transported and purged as waste from the process. Alternatively, a recycling step may be employed to reuse the by-product diol as a reactant in the process. Likewise, the volume demand on an existing recycling step may increase in order to transport the by-product diol created during the process. Despite the addition of such a recycling step or the additional volume demand on an existing recycling step, methods of making macrocyclic oligoesters from low viscosity intermediate molecular weight polyesters can be more cost-effective than prior methods. The cost benefit is due in part to the ability to employ simple distillation in place of expensive finishing steps. Also, transporting low viscosity polyesters is less costly then transporting high viscosity material. Macrocyclic oligoester production methods according to the invention can be conducted continuously, semi-continuously, according to a batch methodology, or a combination thereof.

In another aspect, an embodiment of a method for preparing a macrocyclic oligoester composition includes providing an intermediate molecular weight polyester, a solvent, and a catalyst. The catalyst may comprise, for example, a tin compound or a titanate compound. The intermediate molecular weight polyester, solvent, and a catalyst are heated to produce a composition comprising a macrocyclic oligoester. The method may further include separating the macrocyclic oligoester from the composition comprising the macrocyclic oligoester.

The foregoing, and other features and advantages of the invention, as well as the invention itself, will be more fully understood from the description, drawings, and claims which follow.

DESCRIPTION

In one aspect, a method of the invention for preparing macrocyclic oligoesters generally includes contacting a first compound having a structural formula:

HO—R—OH                                                        (I)

where R is an alkylene, a cycloalkylene, or a mono- or polyoxyalkylene group, with a second compound having a structural formula:

BOOC-A-COOB                                                    (II)

where A is a divalent aromatic group or an alicyclic group, and B is hydrogen or an alkyl group. The compounds of formulas (I) and (II) are contacted in the presence of a first catalyst to produce a composition comprising a hydroxyalkyl-terminated polyester oligomer. Heating the composition comprising the hydroxyalkyl-terminated polyester oligomer at a reduced pressure produces a composition comprising an intermediate molecular weight polyester. Heating the composition comprising the intermediate molecular weight polyester in the presence of a solvent produces a composition comprising a macrocyclic oligoester. Optionally, the macrocyclic oligoester is separated from the composition comprising the macrocyclic oligoester.

Figure 1:
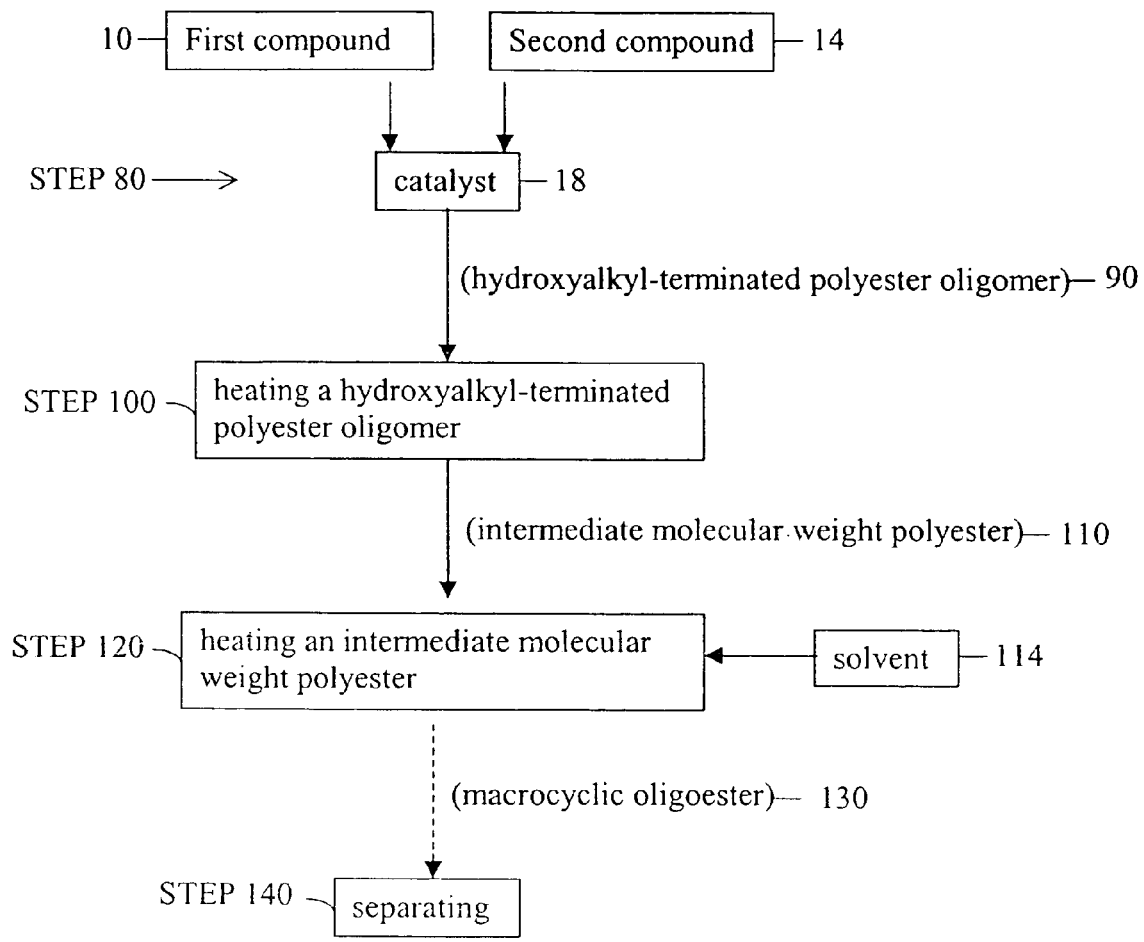
FIG. 1 is a schematic flow diagram of an embodiment of a method of the invention for making a macrocyclic oligoester.

Referring to FIG. 1, in which a flow diagram depicts an embodiment of a method of the invention, an intermediate molecular weight polyester is employed to prepare a composition comprising a macrocyclic oligoester. A first compound 10 is contacted with a second compound 14 in the presence of a first catalyst 18 (STEP 80) to produce a composition comprising a hydroxyalkyl-terminated polyester oligomer 90.

The first compound 10 has the structural formula HO—R—OH. The substituent "R" may be, for example, an alkylene, a cycloalkylene, or a mono- or polyoxyalkylene group. The mono- or polyoxyalkylene group may include between about 2 and about 8 carbon atoms. In one embodiment, the polyoxyalkylene group includes a polyoxyalkylene radical. In some embodiments, the alkylene is ethylene —$(CH_2CH_2)$—, tetramethylene —$(CH_2)_4$—, or a mixture thereof. 1,2-Ethanediol (R=ethylene) may be employed when producing the homopolymer, poly(ethylene terephthalate) ("PET"). Alternatively, to produce poly(butylene terephthalate) ("PBT"), 1,4 butanediol (R=tetramethylene) may be employed. A mixture of these compounds may be used to produce a copolymer, for example, the copolymer poly(butylene terphthalate)/poly(ethylene terephthalate) ("PBT/PET").

The first compound 10 may be an aliphatic diol. In another embodiment, a mixture of diols may include only alkylene glycols such as, for example, ethylene glycol and 1,4-butanediol, or may additionally include ether diols such as diethylene glycol, the product of which is employed to produce a macrocyclic copolyester oligomer.

In one embodiment, the second compound 14 has the structural formula BOOC-A-COOB. The substituent "A" may be, for example, a divalent aromatic group or an alicyclic group. The alicyclic group may be an alicyclic radical, for example, a meta-linked or a para-linked monocylic radical. In one embodiment, the para-linked aromatic group is a para-linked benzene group. In another embodiment, the substituent "A" is a meta- or para-phenylene or a mixture thereof. The substitutent "B" may be, for example, hydrogen or an alkyl group. The alkyl group preferably has from 1 to 6 carbon atoms. Commonly used alkyl groups include methyl and ethyl.

In an exemplary embodiment, the second compound 14 includes one or more aromatic dicarboxylic acids or alkyl esters thereof. The dicarboxylic acid or acids may be employed in their free acid form or, preferably, in the form of an alkyl ester, most often in the form of a diester, for example, a di-($C_{1-4}$ alkyl) ester such as dimethyl terephthalate. Thus, the preferred polyesters are poly(butylene terephthalate) ("PBT"), poly(ethylene terephthalate) ("PET"), the corresponding isophthalates, and copolyesters thereof, i.e., PBT/PET.

When contacting the first compound 10 and the second compound 14 (STEP 80), any conditions may be employed so long as they promote the reaction. Such conditions may include, for example, providing the first compound 10 and the second compound 14 in a molar ratio between about 1.05:1 and about 1.5:1. An amount of catalyst 18 in the range of from about 0.1 mole percent to about 5 mole percent based on the first compound may be provided to promote the reaction conducted in STEP 80. In some embodiments, the amount of catalyst ranges between about 1 mole percent to about 5 mole percent based on the first compound.

When an ester such as dimethyl terephthalate is employed, it is preferred to employ a temperature at which the displaced alkanol will be removed by distillation, thus driving the reaction toward formation of the desired hydroxyalkyl-terminated polyester oligomer composition 90. In one embodiment, the first compound 10 contacts the second compound 14 and the temperature is held between about 140° C. and about 200° C. In another embodiment, the first compound 10 contacts the second compound 14 and the temperature is held between about 160° C. and about 180° C. In yet another embodiment, the first compound 10 contacts the second compound 14 and the temperature is held between about 180° C. and about 200° C.

The catalyst(s) employed in the practice of the invention are adapted to polyester preparation. More specifically, catalysts employed in the invention are those that are capable of catalyzing a transesterification polymerization of a macrocyclic oligoester with a dihydroxyl-functionalized polymer. Numerous such catalysts are known in the art. The catalysts may comprise a tin compound or a titanate compound. As with state-of-the-art processes for polymerizing macrocyclic oligoesters, organotin and organotitanate compounds are the preferred catalysts, although other catalysts may be used. One or more catalysts may be used together or sequentially.

Illustrative examples of classes of tin compounds that may be used in the invention include monoalkyltin(IV) hydroxide oxides, monoalkyltin(IV) chloride dihydroxides, dialkyltin(IV) oxides, bistrialkyltin(IV) oxides, monoalkyltin(IV) trisalkoxides, dialkyltin(IV) dialkoxides, trialkyltin (IV) alkoxides, tin compounds having the formula (III):

(III)

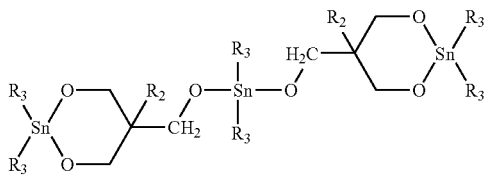

and tin compounds having the formula (IV):

(IV)

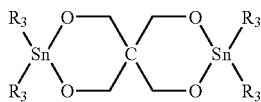

wherein $R_2$ is a $C_{1-4}$ primary alkyl group, and $R_3$ is $C_{1-10}$ alkyl group.

Specific examples of organotin compounds that may be used in this invention include dibutyltin dioxide, 1,1,6,6-tetra-n-butyl-1,6-distanna-2,5,7,10-tetraoxacyclodecane, n-butyltin(IV) chloride dihydroxide, di-n-butyltin(IV) oxide, dibutyltin dioxide, di-n-octyltin oxide, n-butyltin tri-n-butoxide, di-n-butyltin(IV) di-n-butoxide, 2,2-di-n-butyl-2-stanna-1,3-dioxacycloheptane, and tributyltin ethoxide. See, e.g., U.S. Pat. No. 5,348,985 to Pearce et al. In addition, tin catalysts, and other catalysts including titanate compounds described in commonly owned U.S. Ser. No. 09/754,943, may be used in the polymerization reaction.

Titanate compounds may be used in the invention and illustrative examples of titanate compounds include tetraalkyl titanates (e.g., tetra(2-ethylhexyl) titanate, tetraisopropyl titanate, and tetrabutyl titanate), isopropyl titanate, titanate ester, titanate tetraalkoxide. Other illustrative examples include (a) titanate compounds having the formula (V):

(V)

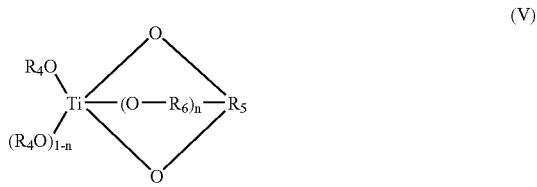

wherein each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1, (b) titanate ester compounds having at least one moiety of the formula (VI):

(VI)

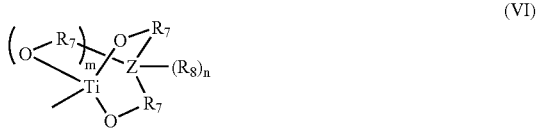

wherein each $R_7$ is independently a $C_{2-3}$ alkylene group; Z is O or N; $R_8$ is a $C_{1-6}$ alkyl group or unsubstituted or substituted phenyl group; provided when Z is O, m=n=0, and when Z is N, m=0 or 1 and m+n=1, and (c) titanate ester compounds having at least one moiety of the formula (VII):

(VII)

wherein each $R_9$ is independently a $C_{2-6}$ alkylene group; and q is 0 or 1.

Referring again to FIG. 1, as described previously, the first compound 10 and the second compound 14 are contacted (STEP 80) in the presence of an above-described catalyst 18 to produce a compound comprising a hydroxyalkyl-terminated polyester oligomer 90. The condensation reaction which takes place in STEP 80 can be considered complete when no remaining alkanol, usually methanol, is found in the distillate. It is usually found that some diol is removed with the alkanol, but diol removal is primarily the function of the later heating steps, (e.g., STEP 100 and STEP 120) described below.

The hydroxyalkyl-terminated polyester oligomer 90 is heated in a first heating step (STEP 100) to produce a composition comprising an intermediate molecular weight polyester 110. In one embodiment, the hydroxyalkyl-terminated polyester oligomer 90 composition is heated under reduced pressure (i.e., pressure less than atmospheric pressure) whereupon further condensation takes place with removal of diol by distillation, producing a composition comprising an intermediate molecular weight polyester 110. Temperatures in the range of about 180–275° C. and pressures in the range of about 5–625 torr are typically employed in this heating step (STEP 100).

In one embodiment, the one or more solvents are employed for removal of by-product diol by distillation, where the by-product diol should be removed before cyclization takes place. The distillation may be, for example, azeotropic distillation. Alternatively, distills or co-distills of the by-product diol may distill off at a temperature below the boiling point of the solvent. Preferably, the boiling point of the selected solvent is higher then the boiling point of the diol that is being removed. Thus, energy- and equipment-intensive methods such as, for example, melt reaction, necessitated by the high melt viscosity of the product are replaced by a simple distillation. The added solvent reduces the viscosity of the macrocyclic polyester product, which enables less costly equipment, which is capable of transporting low viscosity product to be employed in this process.

In some embodiments, during the first heating step (STEP 100) a second catalyst is added to the composition comprising hydroxyalkyl-terminated polyester oligomer 90. One or more of the above-described catalysts may be employed. In one embodiment, the second catalyst that is added in the heating step (STEP 100) is identical to the first catalyst 18 that was introduced in the prior step (STEP 80). The second catalyst may be added, for example, to speed the rate of reaction or to replenish inactivated catalyst.

In another embodiment, the first heating step (STEP 100) is accomplished in multiple stages. For example, first and second stages may be employed. In an exemplary embodiment, the first stage includes heating at a temperature between about 175° C. and about 200° C. and a reduced pressure of between about 550 torr and about 625 torr. Thereafter, the second stage includes heating at an increased temperature between about 225° C. and about 275° C. and a decreased reduced pressure of between about 5 torr and about 15 torr.

In yet another embodiment, the heating step (STEP 100) is conducted until polymerization is about 95–98% complete, e.g., as estimated by the proportion of diol (i.e., the first compound 10) removed by distillation. In one embodiment, aliphatic diol is removed via distillation. In the first heating step (STEP 100), it is not necessary to remove all traces of diol, as any remaining diol is efficiently removed in the second heating step (STEP 120) as described hereinafter. The product of the first heating step (STEP 100) is a composition comprising intermediate molecular weight polyester 110. The intermediate molecular weight polyester 110 may be predominantly linear and in some embodiments it may contain hydroxyalkyl end groups in minor proportion.

In one embodiment, the molecular weight of the intermediate molecular weight polyester is between about 20,000 Daltons and about 70,000 Daltons. In another embodiment, the molecular weight of the intermediate molecular weight polyester is between about 30,000 Daltons and about 60,000 Daltons. In yet another embodiment, the molecular weight of the intermediate molecular weight polyester is between about 40,000 Daltons and about 50,000 Daltons.

The intermediate molecular weight polyester 110 is heated and a solvent 114 is added (STEP 120) to form a composition comprising a macrocyclic oligoester 130. In one embodiment, the second heating step (STEP 120) is employed to remove remaining hydroxyalkyl end groups creating one or more appropriate reactive sites to cause cyclization to form macrocyclic oligomers. The method employs a solvent 114 for three purposes: to lower the viscosity of the mixture, to aid in the removal of by-product diol by distillation, and to provide high dilution conditions which promote cyclization. The hydroxyalkyl end groups that were converted to by-product diol may be recycled within the process by adding the by-product diol to the first compound 10 in STEP 80. Alternatively, the by-product diol may be removed as waste. The intermediate molecular weight polyester 110 may be heated to the reflux temperature of the added solvent 114, for example, a temperature between about 150° C. and about 200° C.

In some embodiments, a diol, i.e., a by-product diol, is produced in the second heating step (STEP 120). The solvent 114 that is employed is capable of forming a mixture with the by-product diol, and removes the last traces of the by-product diol by distillation to afford a macrocyclic oligoester composition 130.

In certain embodiments, it may be desirable to add the solvent in two stages. In a first stage, the solvent is added to assist in the removal of by-product diol that results from the removal of uncyclized end groups from linear polyesters. In the first stage, the amount of intermediate molecular weight polyester in the mixture may increase. Also, the molecular weight of the intermediate molecular weight polyester may increase. In a second stage more solvent is added to provide dilute conditions that promote cyclization and may increase the yield of macrocyclic oligoesters.

Solvents that may be used may be capable of forming an azeotropic mixture with the by-product diol to be removed, for example, with 1,4-butanediol in the case of PBT processing. Alternative solvents may be employed so that the distills or co-distills may distill off at a temperature below the temperature of the solvent.

In one embodiment, the solvent 114 comprises a halogenated aromatic hydrocarbon, for example, ortho-dichlorobenzene. Ortho-dichlorobenzene is particularly useful for treatment of PBT. In another embodiment, the solvent 114 is added in an amount to produce a mixture containing from about 5% to about 25% solids by weight, that is, about 5–25% of linear and cyclic polyesters. The mixture may be a solution. In yet another embodiment, the solvent 114 is added to dilute the composition comprising intermediate molecular weight polyester 110 to about one tenth normal (0.1 N) concentration. The added solvent 114 provides dilute conditions that promote cyclization. By cyclizing intermediate molecular weight oligomers rather then high molecular weight oligomers, the method avoids reaction kinetics that require large sized reactors (i.e., second order kinetics or higher).

In some embodiments, the cyclization yield is generally dependent upon the dilution of macrocyclic oligoester. More dilute conditions typically provide a higher yield of cyclics in the composition comprising macrocyclic oligoesters 130. Table 1 illustrates the relationship between dilution conditions, i.e., the molar concentration of macrocyclic oligoesters based on a monomer molecular weight of 220 Daltons PBT where a terephthalic acid derivative solvent is employed, and yield (see e.g. Table 1). In Table 1, the percentage yield of macrocyclic oligoester was analytically determined using HPLC analysis, assuming a molecular weight of 220 Daltons. Suitable HPLC equipment is available from Hewlett Packard (Palto Alto, Calif.).

TABLE 1

| Experiment Number | Molar Concentration (M) | Percentage Yield (%) |
|---|---|---|
| 1 | 0.049 | 72 |
| 2 | 0.06 | 65.6 |
| 3 | 0.076 | 66.6 |
| 4 | 0.091 | 54.1 |
| 5 | 0.125 | 42.7 |
| 6 | 0.195 | 27.9 |

In some embodiments, a third catalyst is added in the second heating step (STEP 120) to the composition comprising intermediate molecular weight polyester. The catalyst may be any compound catalytically effective for depolymerization of a linear polyester to macrocyclic oligomer species. Also useful are catalysts effective for polymerization of macrocyclic oligomers to linear polyesters, since this reaction is the reverse of the depolymerization reaction and employs the same catalysts with changes in other conditions such as dilution. Numerous compounds with such activity are known in the art, for example, the titanium and tin compounds described in U.S. Pat. Nos. 5,407,984; 5,668,186; 5,389,719; 5,466,744; 5,527,976; 5,648,454; 5,661,214; and 5,710,086.

Among the compounds active as depolymerization catalysts, as noted in the aforementioned U.S. Pat. No. 5,466,744, are the tetraalkyl titanates employed in contacting step (STEP 80) and the first heating step (STEP 100) of the present invention. Thus, it may be possible to conduct the second heating step (STEP 120) without addition of further catalyst. It is sometimes advisable to replenish the catalyst, however, since some loss of activity may occur in the prior steps (STEP 80 and STEP 100). Whether or not catalyst replenishment is necessary can be determined by monitoring the rate of the reaction. For example, in some embodiments, catalyst is added in the first step (STEP 80) and additional catalyst is added in the second heating step (STEP 120), upon reduction of the reaction rate.

The amount of catalyst, if any, added in the second heating step (STEP 120) may be identical or similar to the quantity of catalyst introduced in the first step (STEP 80). In an exemplary embodiment, the type of catalyst that is added in the second heating step (STEP 120) is the same as the type of catalyst that is added in the first step (STEP 80). In another embodiment, the type of catalyst added in the second heating step (STEP 120) is different then the type of catalyst that was added in the first step (STEP 80).

Upon completion of the second heating step (STEP 120), the composition comprising a macrocyclic oligoester is formed. In one embodiment, water is added during the second solvent removal. In another embodiment, water is added after the second heating step. The quantity of water that may be added may be the molar equivalent of the total catalyst used. For example, where a total of 10 mmol of catalyst have been used in the process (STEP 80, STEP 100, and STEP 120) then 10 mmol of water may be added upon completion of STEP 120 to quench the reaction mixture and terminate the reaction.

In yet another embodiment, an additional step (STEP 140) is conducted to separate macrocyclic oligoesters from the composition comprising macrocyclic oligoesters. In some embodiments, the composition comprising macrocyclic oligoesters includes macrocyclic oligomers and linear oligomers. In some embodiments, linear polyester is separated from the composition comprising macrocyclic oligoester resulting in a material in which the principal constituents are macrocyclic oligoester, normally a mixture of oligoesters of varying degrees of polymerization where those between about 2 and about 7 are present in greatest proportion.

Separation methods employed in the separating step (STEP 140) to remove the linear polyester may be selected from such operations known in the art as filtration, filtration at a reduced temperature, and adsorption. For example, the mixture may be cooled and filtered to remove linears. The filtrate may then be subjected to adsorption using alumina to remove final traces of linears, alternatively, adsorption may be accomplished using column chromatography with silica to remove final traces of linears. After the final traces of linears are removed, the macrocyclic oligoesters may be isolated by precipitation with a non-solvent, typically an aliphatic hydrocarbon, and preferably a $C_{6-10}$ hydrocarbon such as heptane.

In one exemplary embodiment, a method for preparing a macrocyclic oligoester composition includes conducting a reaction between at least one aliphatic diol and at least one aromatic dicarboxylic acid or alkyl ester thereof as reactants in the presence of a catalyst, to produce a hydroxyalkyl-terminated polyester oligomer composition (STEP 80). The method includes heating the hydroxyalkyl-terminated polyester oligomer under reduced pressure to distill off aliphatic diol, thereby producing a intermediate molecular weight polyester (STEP 100). The method includes heating the intermediate molecular weight polyester in the presence of a catalyst and a solvent that is capable of forming a mixture with the aliphatic diol. The last traces of the aliphatic diol are removed by distillation to afford a composition comprising a macrocyclic oligoester (STEP 120). The method includes removing linear polyester from the macrocyclic oligomer-enriched polyester composition (STEP 140).

In one embodiment, the reactants in the reaction (STEP 80) are ethylene glycol and/or 1,4-butanediol and dimethyl terephthalate, where these reactants yield a PBT/PET copolymer. In another embodiment, 1,4-butanediol is reacted with dimethyl terephthalate to yield a PBT homopolymer. In another embodiment, the catalyst 18 is a titanate ester. In another embodiment, the titanate ester is tetraisopropyl titanate. In another embodiment, the temperature of the reaction (STEP 80) is one at which displaced methanol is removed by distillation. In another embodiment, the temperature of the reaction step (STEP 80) is in the range of about 140–200° C.

In one embodiment, the solvent employed in the second heating step (STEP 120) is a halogenated aromatic hydrocarbon. In another embodiment, the solvent is orotho-dichlorobenzene. In one embodiment, the catalyst employed in the reaction (STEP 80) is also active in the second heating step (STEP 120). In another embodiment, additional catalyst is added in the second heating step (STEP 120). In another embodiment, the amount of solvent employed is an amount to produce a solution containing about 5–25% solids by weight. In another embodiment, the method includes a quenching operation following the second heating step (STEP 120). In one embodiment, the separation step (STEP 140) includes filtration or adsorption.

Figure 2:
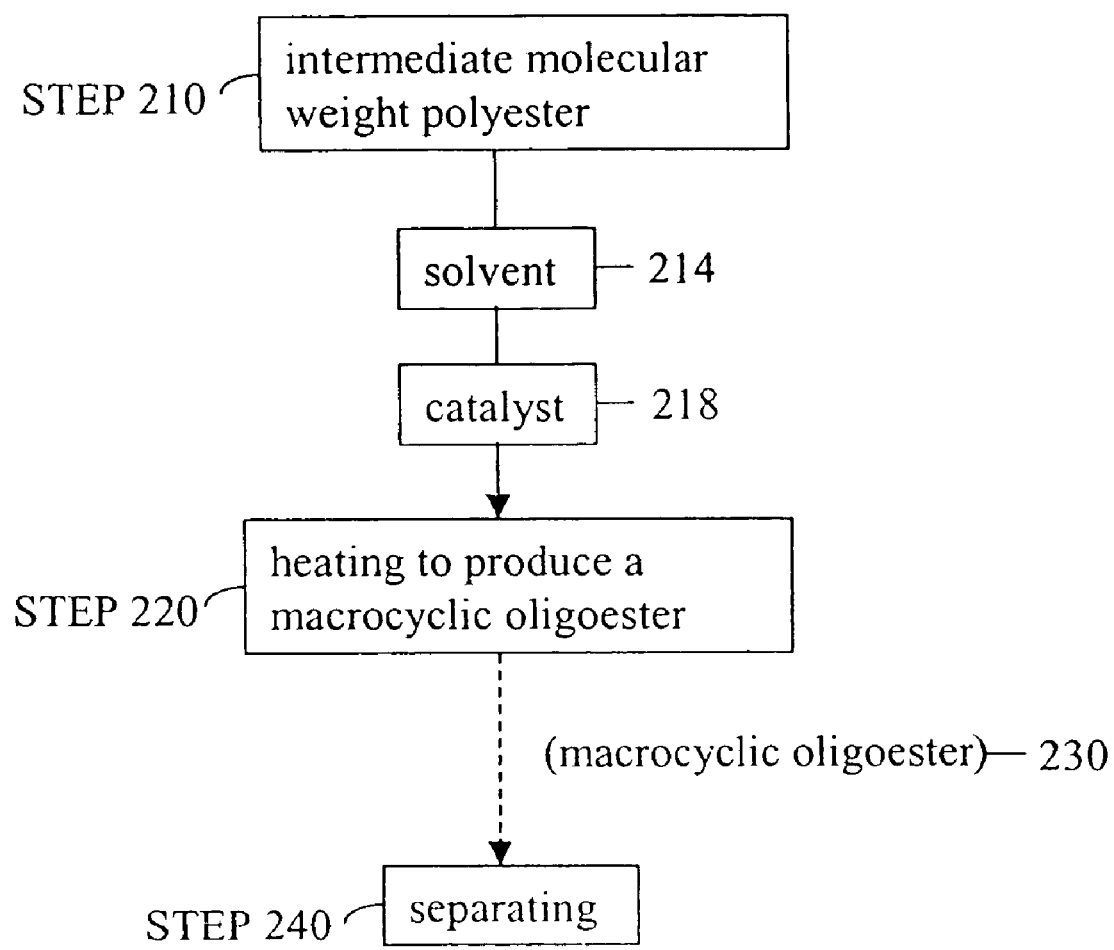
FIG. 2 is a schematic flow diagram of another embodiment of a method of the invention for making a macrocyclic oligoester.

Referring to FIG. 2, in another aspect of the invention, a method for preparing a macrocyclic oligoester composition includes providing an intermediate molecular weight polyester, providing a solvent and a catalyst (STEP 210). In some embodiments, a composition comprising intermediate molecular weight polyester is provided. As described above, in one embodiment, the intermediate molecular weight polyester has a molecular weight between about 20,000 Daltons and about 70,000 Daltons. A solvent 214 and a catalyst 218 are added.

The intermediate molecular weight polyester, solvent 214, and catalyst 218 are heated (STEP 220) to produce a composition comprising a macrocyclic oligoester 230. In this step (STEP 220), as described above in relation to the second heating step of FIG. 1 (STEP 120), the added solvent 214 aids in the removal of by-product diol by distillation, provides high dilution conditions which promote cyclization, and lower the viscosity of the mixture.

In certain embodiments, it may be desirable to add the solvent in two stages. In a first stage, solvent is added to assist in the removal of by-product diol that results from the removal of uncyclized end groups from linear polyesters. In the first stage, the amount of intermediate molecular weight polyester in the mixture may increase. Also, the molecular weight of the intermediate molecular weight polyester may increase. In a second stage more solvent is added to provide dilute conditions that promote cyclization and may increase the yield of macrocyclic oligoesters.

The by-product diol may be recycled within the process by contacting the by-product diol to the second compound 14 in (STEP 80). Alternatively the by-product diol may be removed as waste. The by-product diol may be, for example, 1,4-butane diol. The catalyst 218 that is employed affects the rate of reaction. The type and quantity of catalyst 218 that may be employed may be the type and quantity of catalyst 18 that is described above with regard to FIG. 1.

Similarly, the type and quantity of solvent 214 that may be employed in this embodiment (STEP 220) is the same as the type and quantity of solvent 114 that is described above in the second heating step of FIG. 1 (STEP 120). For example, the solvent 214 may be added in an amount to produce a solution containing from about 5% to about 25% solids by weight. The solvent 214 that may be added may include, for example, 1,4-butanediol, a halogenated aromatic hydrocarbon, or a halogenated aromatic hydrocarbon comprising ortho-dichlorobenzene. The intermediate molecular weight polyester may be heated to a temperature between about 150° C. and about 200° C.

In one embodiment, the method is complete when the composition comprising macrocyclic oligoester 230 is formed, which is upon completion of the heating step (STEP 220). In another embodiment, water is added after the heating step to quench the reaction mixture and terminate the reaction prior to solvent removal. The quantity of water that may be added may be the molar equivalent of the total catalyst used. For example, where a total of 10 mmol of catalyst have been used in the process (STEP 210 and STEP 220) then 10 mmol of water may be added upon completion of (STEP 220) to quench the reaction mixture and terminate the reaction.

In yet another embodiment, a separation step (STEP 240) may be employed to separate macrocyclic oligoesters from the composition comprising macrocyclic oligoesters 230. In some embodiments, linear polyester is separated from the composition comprising macrocyclic oligester 230 to leave a material in which the principal constituents are macrocyclic oligoester, normally a mixture of oligoesters of varying degrees of polymerization where those between about 2 and about 7 are present in greatest proportion. Separation methods employed in the separation step to remove the linear polyester may be selected from such operations known in the art as filtration, filtration at a reduced temperature, and adsorption.

The invention is illustrated further by the following non-limiting examples. In the examples, each of the steps of FIG. 1 (STEPS 80, 100, 120, and 140) is described in a separate example. Frequently, however, these steps can and will be performed as a single sequence.

EXAMPLE 1

As an example of STEP 80, a 3-necked flask fitted with a stirrer, thermometer and vacuum-jacketed Vigreux distillation column, charged with 100 g (515 mmol) of dimethyl terephthalate, 72.21 g (802 mmol) of 1,4-butanediol and 7.1 g (25 mmol) of isopropyl titanate. Vigreux distillation column obtained from Ace Glass, Incorporated (Vineland, N.J.). The resulting mixture was heated over 90 minutes to 175° C., with stirring, as methanol was removed by distillation. At the end of this period, some 1,4-butanediol was also removed. The product was the desired 4-hydroxybutyl-terminated PBT oligomer composition as analytically determined by HPLC. The analysis employed a Hewlett Packard HPLC, Model 1110 (Palo Alto, Calif.) equipped with a diode array detector set at 254 nM, a Zorbax C-8 reverse phase column maintained at 40° C. with a solvent gradient of acetonitrile and water.

EXAMPLE 2

As an example of STEP 100, the pressure in the flask of Example 1 was reduced to 600 torr and distillation was continued at 195° C. for 60 minutes. The pressure was reduced further as distillation of 1,4-butanediol was continued at 215° C./150 torr for 45 min, 230° C./40 torr for 40 min and 240° C./10 torr for 40 min. The flask was cooled to 180° C. and returned to atmospheric pressure, yielding a PBT of intermediate molecular weight of about 20,000 Daltons weighing 113 grams. The molecular weight of the intermediate molecular weight PBT is determined by gel permeation chromatography (GPC) relative to polystyrene standards using an Hewlett Packard HPLC, Model 1050 (Palo Alto, Calif.). The HPLC is equipped with a fixed wavelength detector set at 254 nM, two linear Phenogel GPC columns where each column measures 300 mm×7.8 mm and the Phenogel has a 5 micron particle size and maintained at a temperature of 40° C. The solvent, chloroform ($CHCl_3$) is passed through the GPC columns at a rate of 1.0 mL/min.

EXAMPLE 3

As an example of STEP 120 or STEP 220, ortho-dichlorobenzene (o-DCB), 1,300 ml, was added to the flask of Example 3 to produce a solution with 10% solids concentration. Heating under reflux was begun and o-DCB was removed by distillation. Samples of the product were periodically removed and their average molecular weight were determined as described above, by GPC relative to polystyrene standards using an Hewlett Packard HPLC, Model 1050 (Palo Alto, Calif.), and when the molecular weight value reached 100,000 Daltons, an additional 6.84 liters of o-DCB was added and heating under reflux was resumed for 1.5 hrs. The reaction was then quenched by the addition of 2 ml of water and 70% of the o-DCB was removed with 1,4-butanediol by azeotropic distillation, yielding a PBT composition enriched in macrocyclic oligomer content as analytically determined according to the above described methods by HPLC employing a Hewlett Packard HPLC, Model 1110 (Palo Alto, Calif.).

EXAMPLE 4

As an example of STEP 140 or STEP 240, the composition of Example 3 was cooled to 70° C. and insoluble linear polyester was removed by filtration using a Buchner funnel under vacuum conditions. The filtrate was passed through an alumina column to remove additional linears including residual end groups; combined linears could be recycled for conversion to cyclics or conversion by depolymerization to dimethyl terephthalate. Suitable alumina is alumina with Brockman Activity Grade I available from Whatman (Clifton, N.J.) that is packed into a standard laboratory column.

Further concentration to 50% solids was effected by o-DCB stripping which was determined effected when a quantity of o-DCB was condensed off of the process. Heptane was introduced in a threefold volume amount, resulting in the precipitation of the desired macrocyclic PBT oligomer mixture, which was removed by filtration and dried in vacuum. The macrocyclic PBT could be polymerized by contact with a stannoxane catalyst at 190° C.

In the following example, the steps (STEPS 210 and 220) of FIG. 2 are described.

EXAMPLE 5

As an example of STEP 210, 2.15 grams of PBT of intermediate molecular weight, 42,000 Daltons, is provided. The molecular weight of the intermediate molecular weight PBT was determined by gel permeation chromatography (GPC) relative to polystyrene standards according to the above described methods employing a Hewlett Packard HPLC, Model 1050. 143 grams of the solvent o-DCB was added to the 2.15 grams of intermediate molecular weight PBT. This stirred reaction mixture was heated to reflux, where 15 grams of o-DCB was removed by azeotropic distillation to complete the drying of the 0.1 Molar mixture of PBT and o-DCB and to form a dry solution. Then 0.49 mmole of organo titanate catalyst was added to the dry solution.

In STEP 220, the PBT catalyst and dry solution was heated at reflux for a period of 30 min. to produce a macrocyclic oligoester. The production of macrocyclic oligoester was confirmed when HPLC analysis assuming a molecular weight of 220 Daltons demonstrated that macrocyclic oligoester in the form of an oligomeric cyclic array was present at a concentration of 9.3 g/L, which is a 48% yield. The analysis employed the above-described Hewlett Packard HPLC, Model 1110.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

Each of the patent documents and scientific publications disclosed hereinabove is incorporated by reference herein.

What is claimed is:

1. A method for preparing a macrocyclic oligoester comprising the steps of:
   (a) providing a composition comprising a polyester oligomer;
   (b) heating the composition comprising the polyester oligomer to produce a composition comprising an intermediate molecular weight polyester; and
   (c) heating the composition comprising the intermediate molecular weight polyester in the presence of a solvent to produce a composition comprising a macrocyclic oligoester.

2. The method of claim 1 wherein step (b) further comprises adding a catalyst to the composition comprising the polyester oligomer.

3. The method of claim 2 wherein the catalyst comprises a tin compound or a titanate compound.

4. The method of claim 3 wherein the tin compound comprises a compound selected from the group consisting of: (a) monoalkyltin(IV) hydroxide oxide, (b) monoalkyltin (IV) chloride dihydroxide, (c) dialkyltin(IV) oxide, (d) bistrialkyltin(IV) oxide, (e) monoalkyltin(IV) trisalkoxide, (f) dialkyltin(IV) dialkoxide, (g) trialkyltin(IV) alkoxide, (h) a tin compound having the formula:

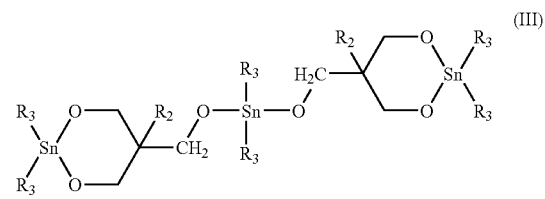

and
(i) a tin compound having the formula:

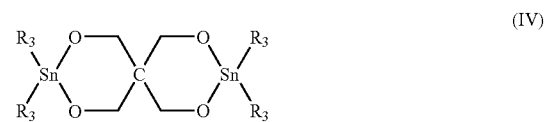

wherein:
$R_2$ is a $C_{1-4}$ primary alkyl group, and
$R_3$ is $C_{1-10}$ alkyl group.

5. The method of claim 3 wherein the titanate compound comprises a compound selected from the group consisting of: (a) tetraisopropyl titanate, (b) isopropyl titanate, (c) tetraalkyl titanate, (d) titanate tetraalkoxide, (e) a titanate compound having the formula:

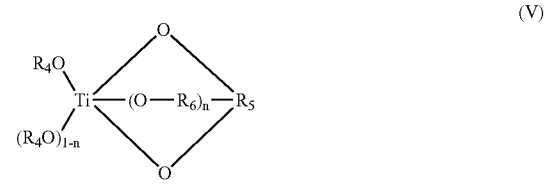

wherein:
each $R_4$ is independently an alkyl group, or the two $R_4$ groups taken together form a divalent aliphatic hydrocarbon group;
$R_5$ is a $C_{2-10}$ divalent or trivalent aliphatic hydrocarbon group;
$R_6$ is a methylene or ethylene group; and
n is 0 or 1,
(f) a titanate ester compound having at least one moiety of the formula:

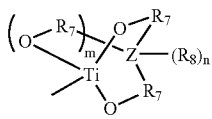
(VI)

wherein:
each $R_7$ is independently a $C_{2-3}$ alkylene group;
$Z$ is O or N;
$R_8$ is a $C_{1-6}$ alkyl group or unsubstituted or substituted phenyl group;
provided when Z is O, m=n=0, and when Z is N, m=0 or 1 and m+n=1,
and
(g) a titanate ester compound having at least one moiety of the formula:

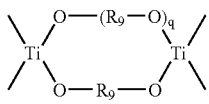
(VII)

wherein:
each $R_9$ is independently a $C_{2-6}$ alkylene group;
and q is 0 or 1.

6. The method of claim 1 wherein step (b) comprises heating at a temperature between about 180° C. and about 275° C.

7. The method of claim 1 wherein step (b) comprises heating at a reduced pressure between about 5 torr and about 625 torr.

8. The method of claim 1 wherein the step (b) comprises a first stage and a second stage.

9. The method of claim 8 wherein the first stage comprises heating at a temperature between about 175° C. and about 200° C. and a reduced pressure of between about 550 torr and about 625 torr, and the second stage comprises heating at a temperature between about 225° C. and about 275° C. and a reduced pressure of between about 5 torr and about 15 torr.

10. The method of claim 1 wherein the product of step (b) has a percentage yield between about 95% and about 98%.

11. The method of claim 1 wherein the molecular weight of the intermediate molecular weight polyester is between about 20,000 Daltons and about 70,000 Daltons.

12. The method of claim 1 wherein step (c) comprises heating at a temperature between about 150° C. and about 200° C.

13. The method of claim 1 wherein step (c) comprises adding a second catalyst to the composition comprising the intermediate molecular weight polyester.

14. The method of claim 13 wherein the catalyst and the second catalyst are identical.

15. The method of claim 1 wherein a diol is produced in step (c), and wherein the solvent is capable of forming an azeotrope with the diol.

16. The method of claim 15 wherein the solvent comprises a halogenated aromatic hydrocarbon.

17. The method of claim 16 wherein the halogenated aromatic hydrocarbon is ortho-dichlorobenzene.

18. The method of claim 1 wherein step (c) comprises adding the solvent in an amount to produce a mixture containing from about 5% to about 25% solids by weight.

19. The method of claim 1 wherein the method further comprises adding water to the composition comprising the macrocyclic oligoester.

20. The method of claim 1 further comprising the step of:
(d) separating the macrocyclic oligoester from the composition comprising the macrocyclic oligoester.

21. The method of claim 20 wherein step (d) comprises separating the macrocyclic oligoester by filtering.

22. The method of claim 21 wherein step (d) comprises separating the macrocyclic oligoester by filtering at a reduced temperature.

23. The method of claim 20 wherein step (d) comprises separating the macrocyclic oligoester by adsorption.

24. The method of claim 1 wherein the polyester oligomer is a hydroxylalkyl-terminated polyester oligomer.

25. The method of claim 1 wherein a diol is produced in step (c) and wherein the solvent is capable of forming an azeotrope with the diol.

26. The method of claim 1 wherein the solvent comprises a halogenated aromatic hydrocarbon.

* * * * *